(12) United States Patent
Yamagata

(10) Patent No.: US 6,922,213 B2
(45) Date of Patent: Jul. 26, 2005

(54) TRANSPORT STREAM DECODER AND DIGITAL BROADCASTING RECEIVING DEVICE USING THE SAME

(75) Inventor: Toyomi Yamagata, Matsubara (JP)

(73) Assignee: Sanyo Electric Co., Ltd., Moriguchi (JP)

(*) Notice: Subject to any disclaimer, the term of this patent is extended or adjusted under 35 U.S.C. 154(b) by 557 days.

(21) Appl. No.: 10/103,815

(22) Filed: Mar. 25, 2002

(65) Prior Publication Data

US 2002/0140868 A1 Oct. 3, 2002

(30) Foreign Application Priority Data

Mar. 29, 2001 (JP) ...................................... 2001-096456

(51) Int. Cl.[7] ........................... H04N 5/04; H04N 5/073
(52) U.S. Cl. ................ 348/423.1; 348/500; 348/425.4; 348/554; 348/555; 348/512; 370/314
(58) Field of Search ................................. 348/555, 554, 348/725, 726, 729, 423.1, 425.1, 425.4, 720, 723, 500, 507, 512; 370/395.64, 314, 537, 487; 375/355, 359, 356, 240.28; 386/98

(56) References Cited

U.S. PATENT DOCUMENTS

| | | | | |
|---|---|---|---|---|
| 5,583,562 A | * | 12/1996 | Birch et al. ................. | 725/151 |
| 5,588,025 A | * | 12/1996 | Strolle et al. ............... | 375/316 |
| 6,285,408 B1 | * | 9/2001 | Choi et al. .................. | 348/555 |
| 6,377,613 B1 | * | 4/2002 | Kawabe et al. ............. | 375/142 |
| 6,504,855 B1 | * | 1/2003 | Matsunaga ................... | 370/537 |
| 6,515,987 B1 | * | 2/2003 | Carrozza et al. ............ | 370/366 |
| 6,804,259 B1 | * | 10/2004 | Onagawa .................... | 370/476 |

FOREIGN PATENT DOCUMENTS

| | | |
|---|---|---|
| JP | 2000-115739 | 4/2000 |
| WO | WO99/60736 | 11/1999 |

OTHER PUBLICATIONS

Office Action dated Nov. 4, 2003 with English Translation.

* cited by examiner

Primary Examiner—John Miller
Assistant Examiner—Jean W. Désir
(74) Attorney, Agent, or Firm—Armstrong, Kratz, Quintos, Hanson & Brooks, LLP.

(57) ABSTRACT

In a transport stream decoder, a plurality of synchronization establishment circuits receive a plurality of different transport streams and a plurality of input clocks corresponding thereto, to establish synchronization between the transport streams and the input clocks. A multiple TS time-division multiplexing circuit receives outputs of two FIFO memories, converts a plurality of transport stream signals into time-division multiplexing signals synchronizing with an internal processing clock, and provides an addition of a TS identification signal indicating which one of the transport streams corresponds to each time-division multiplexing signal. Therefore, a TS decoder with suppressed circuit scale can be provided even when different types of transport streams are handled.

7 Claims, 11 Drawing Sheets

TRANSPORT STREAM DECODER AND DIGITAL BROADCASTING RECEIVING DEVICE USING THE SAME

BACKGROUND OF THE INVENTION

1. Field of the Invention

The present invention relates to a configuration of a transport stream decoder for extracting a transport stream (hereinafter referred to as TS) in a digital broadcasting receiving device, and to a configuration of the digital broadcasting receiving device using the transport stream decoder.

2. Description of the Background Art

In addition to BS and CS digital broadcasting for which actual broadcasting has already been started, CS digital broadcasting at 110 degrees east longitude, terrestrial digital broadcasting and the like have been attempted for practical use. Accordingly, a digital broadcasting receiving device that receives such digital broadcasting is required to handle a plurality of transport streams.

Moreover, in a system for receiving digital broadcasting, transport streams may be supplied from media other than broadcasting, for example, a recording medium such as a video tape decoder or hard disk (HDD).

Configuration of Conventional Digital Broadcasting Receiving Device 2000

Figure 6:
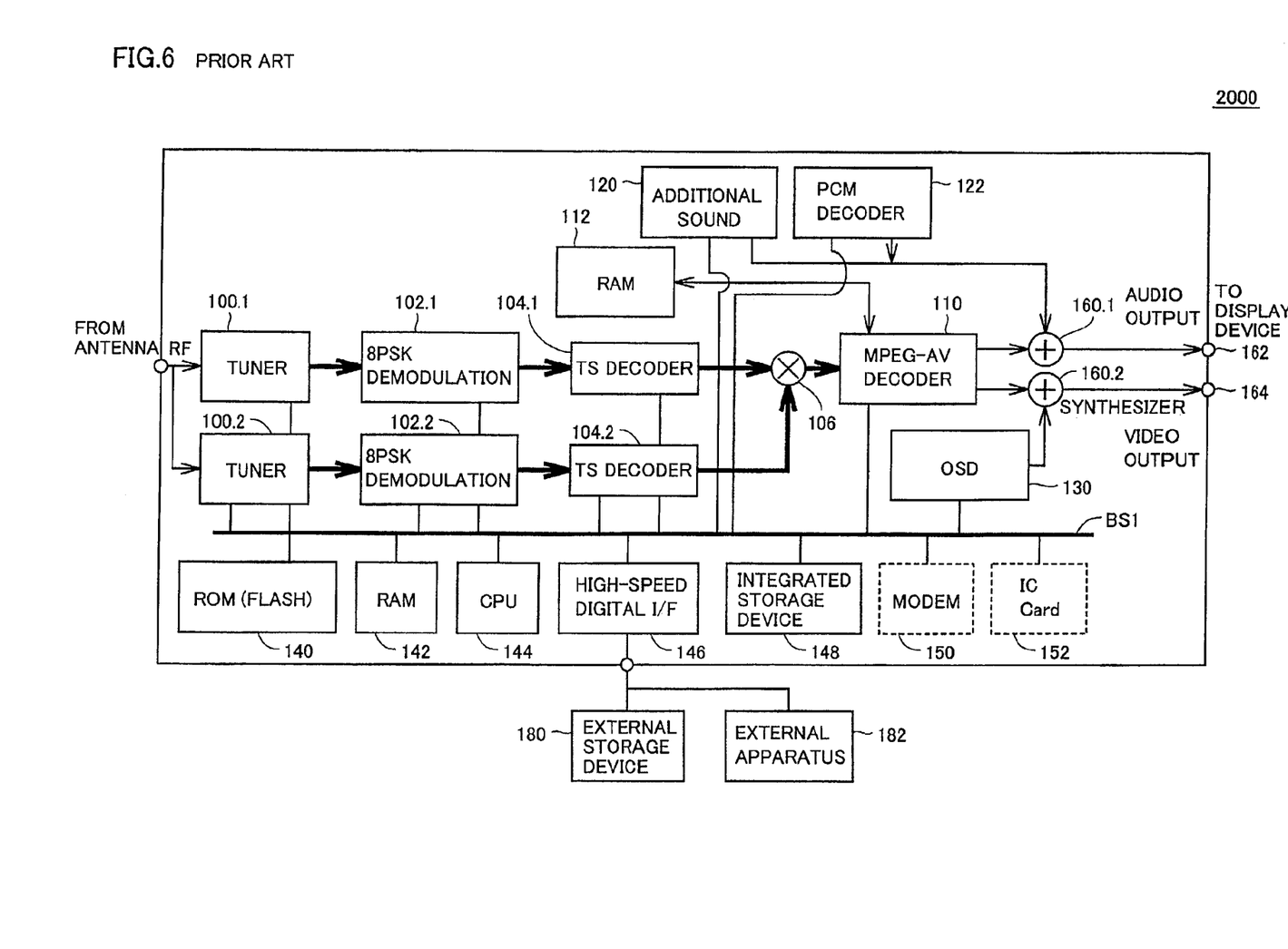
FIG. 6 is a schematic block diagram showing an extracted principle portion of the configuration of the conventional digital broadcasting receiving device 2000.

FIG. 6 is a schematic block diagram showing an extracted principle portion of the configuration of conventional digital broadcasting receiving device 2000.

Referring to FIG. 6, in digital broadcasting receiving device 2000, a RF signal received by an antenna (not shown) is tuned by tuners 100.1 and 100.2, and the tuned signals are applied to 8PSK demodulators 102.1 and 102.2, respectively.

Demodulated signals from 8PSK demodulators 102.1 and 102.2 are applied to transport stream decoders (hereinafter referred to as TS decoders) 104.1 and 104.2, respectively, and are then applied to an MPEG-AV decoder 110 via a switch 106. Thus, in the circuitry from TS decoders 104.1 and 104.2, a baseband signal is extracted from a tuned channel.

It is noted that, though FIG. 6 shows 8PSK as an example of a modulation demodulation system, the modulation demodulation system is not particularly limited thereto.

MPEG-AV decoder 110 receives data streams provided by switch 106, and uses a random access memory (hereinafter referred to as RAM) 112 as a buffer for temporarily storing data. Then, the data streams are converted into video and audio signals.

Here, two systems, i.e. a system from tuner 100.1 to TS decoder 104.1 and a system from tuner 100.2 to TS decoder 104.2, are provided as described above in order to, for example, receive data to be stored into a storage device, which will be described later, in the background, even during the period in which the video and audio signals selected by a user are displayed on a display device (not shown).

Digital broadcasting receiving device 2000 further includes an integrated storage device 148 receiving signals from TS decoders 104.1 and 104.2 via a data bus BS1 and storing the signals; a central processing unit (CPU) 144 performing a predetermined process on the data stored in integrated storage device 148 and producing an output via data bus BS1; a ROM 140 for recording a program executed in an operation process performed by central processing unit 144; a RAM 142 providing a memory region for central processing unit 144 to operate; and a high-speed digital interface 146 allowing data input/output between bus BS1 and the outside. For integrated storage device 148 and ROM 140, though not particularly limited thereto, for example, a flash memory may be used into/from which data can be electrically written/read.

After central processing unit 144 performs a process on the data stored in integrated storage device 148 according to an externally-applied instruction, the data is applied to a synthesizer 160.2 through an On Screen Display (OSD) processing portion 130.

Synthesizer 160.2 synthesizes an output of MPEG-AV decoder 110 and an output of On Screen Display processing portion 130, and provides the synthesized result to a video output terminal 164. An output of video output terminal 164 is provided to a display device (not shown).

Digital broadcasting receiving device 2000 further includes an additional sound generator 120 receiving e.g. data of the result of the process performed by central processing unit 144, and generating a sound effect and the like to be output onto a display device (not shown) based on the data stored in integrated storage device 148, to provide the generated sound effect and the like to a synthesizer 160.1; and a PCM decoder 122 receiving the data processed by central processing unit 144, and generating an audio signal based on the data or the like stored in integrated storage device 148, to provide the generated signal to synthesizer 160.1.

Synthesizer 160.1 receives an output of MPEG-AV decoder 110 and outputs of additional sound generator 120 and PCM decoder 122, and providing a synthesized result to audio output terminal 162. The audio signal provided to audio output terminal 162 is output from a display device (not shown) as sound.

It is noted that digital broadcasting receiving device 2000 may have such a configuration, if required, that includes a modem 150 for transmitting/receiving data to/from the outside, and an IC card interface 152 for receiving information from an IC card.

Through high-speed digital interface 146, for example, an external storage device 180 such as an HDD device for a home server and a remote controller (or a keyboard or the like) 182 which is an external input apparatus are connected to data bus BS1.

Figure 7:
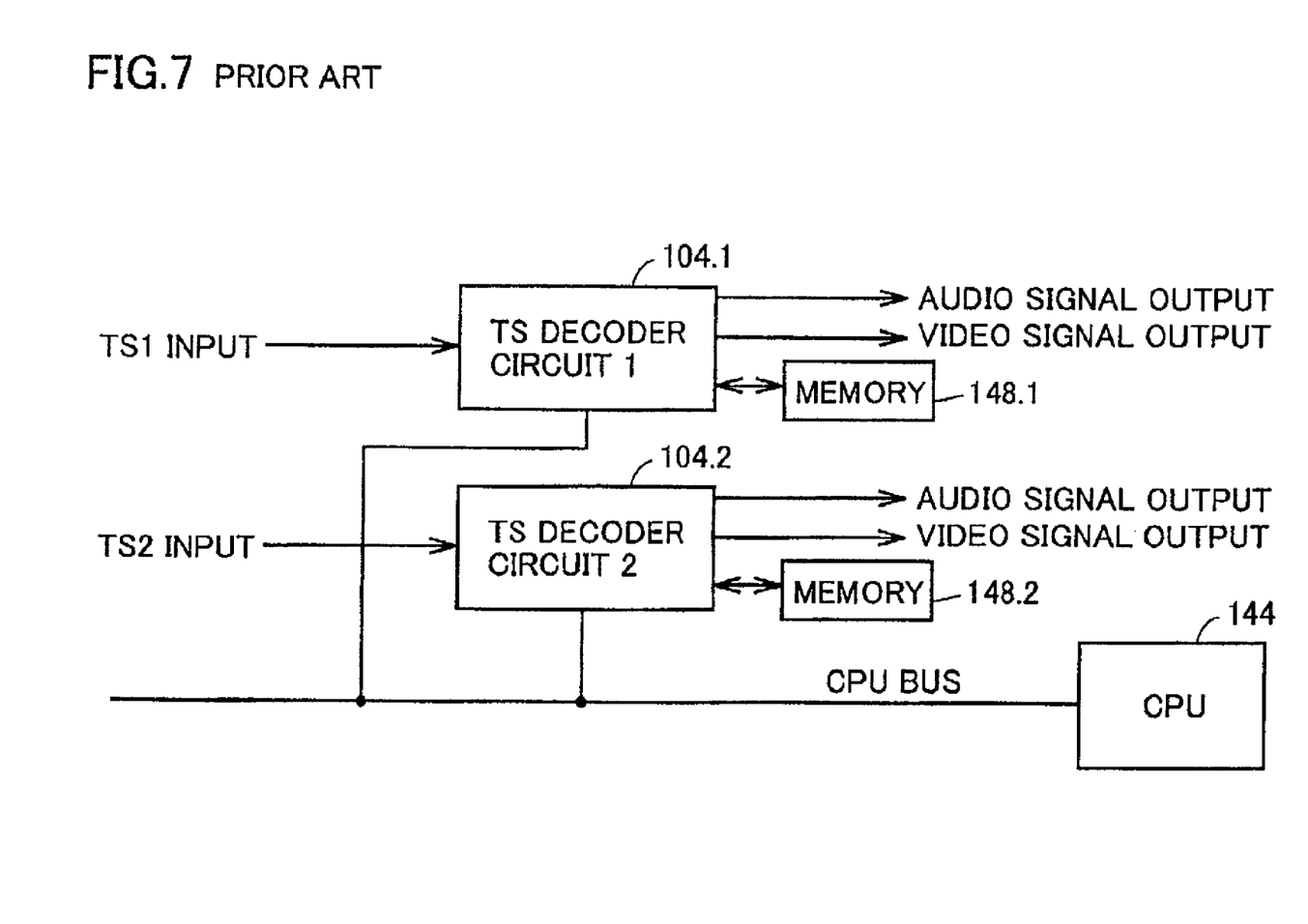
FIG. 7 is a schematic block diagram for illustrating in more detail the configurations of TS decoders 104.1 and 104.2.

FIG. 7 is a schematic block diagram for more specifically illustrating the configurations of TS decoders 104.1 and 104.2 shown in FIG. 6. FIG. 7 particularly shows a state where different types of transport streams TS1 and TS2 are input into TS decoders 104.1 and 104.2, respectively.

Each of transport streams TS1 and TS2 includes, besides video and audio signals, for example, so-called "section data" such as electronic program information. TS decoders 104.1 and 104.2 select, under the control of CPU 144, a transport stream in accordance with designation by the user, and separates the section data from the audio and video signals to be provided to MPEG-AV decoder 110, while performing transmission/reception of data to/from respective memories 148.1 and 148.2 in integrated storage device 148.

Figure 8:
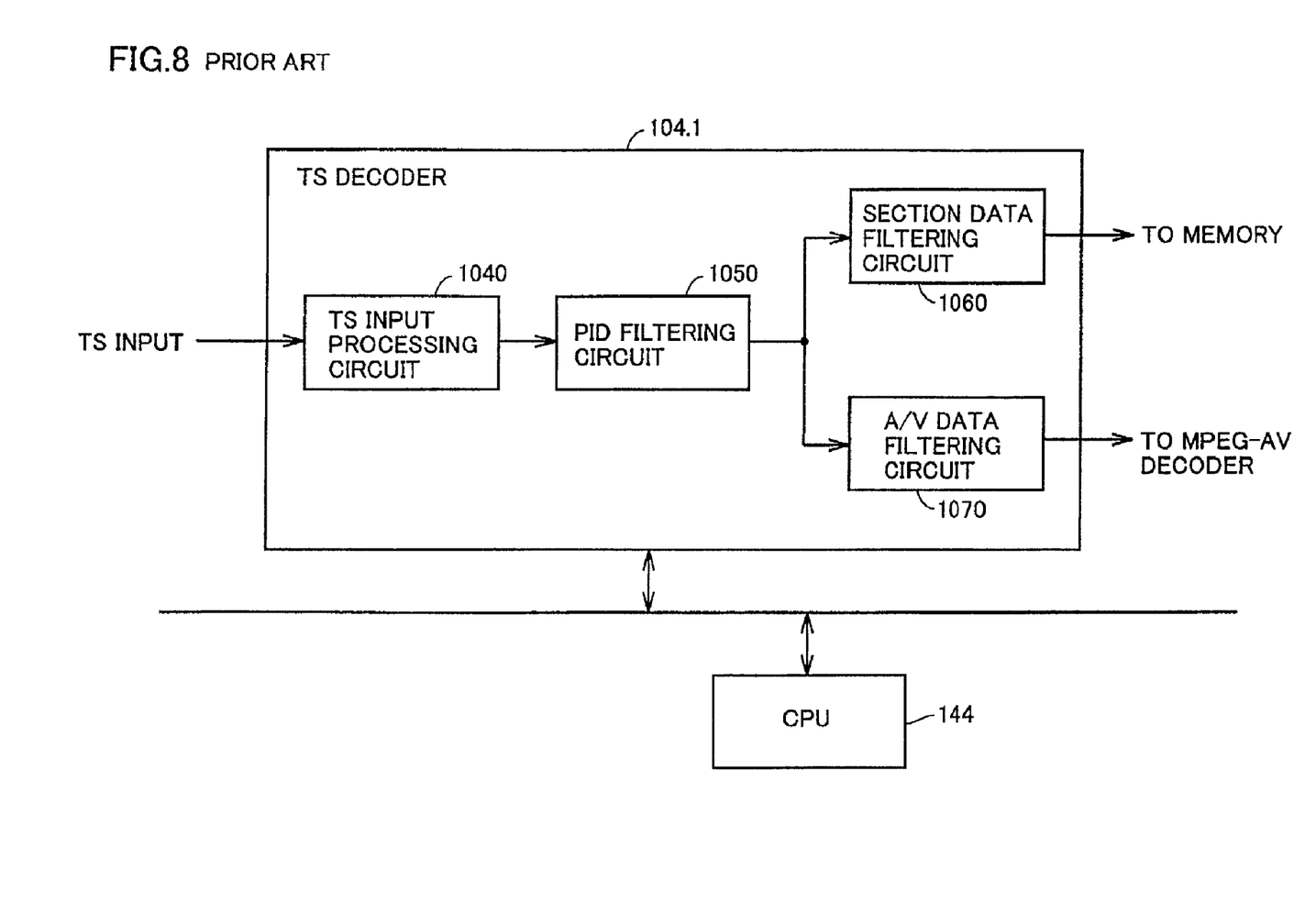
FIG. 8 is a schematic block diagram for more specifically illustrating the configuration of TS decoder 104.1 shown in FIG. 7.

FIG. 8 is a schematic block diagram for illustrating the configuration of TS decoder 104.1 shown in FIG. 7. TS decoder 104.2 basically has a similar configuration.

Referring to FIG. 8, TS decoder 104.1 includes a TS input processing circuit 1040 performing a synchronization process on the input transport stream to match the operation synchronizing with a TS input clock from a front end with an internal clock (system clock), and thereafter adding information required for a process in an internal circuit to produce an output; a PID filtering circuit 1050 receiving an output of TS input processing circuit 1040, filtering the received output based on a packet ID (PID), and separating the section data from video and audio signals; a section data filtering circuit 1060 receiving and filtering the section data separated by PID filtering circuit 1050 and producing an output to memory 148.1 for temporarily saving the section data; and an A/V data filtering circuit 1060 receiving and filtering the video and audio signals separated by PID filtering circuit 1050 and producing an output toward MPEG-AV decoder 110.

Figure 9:
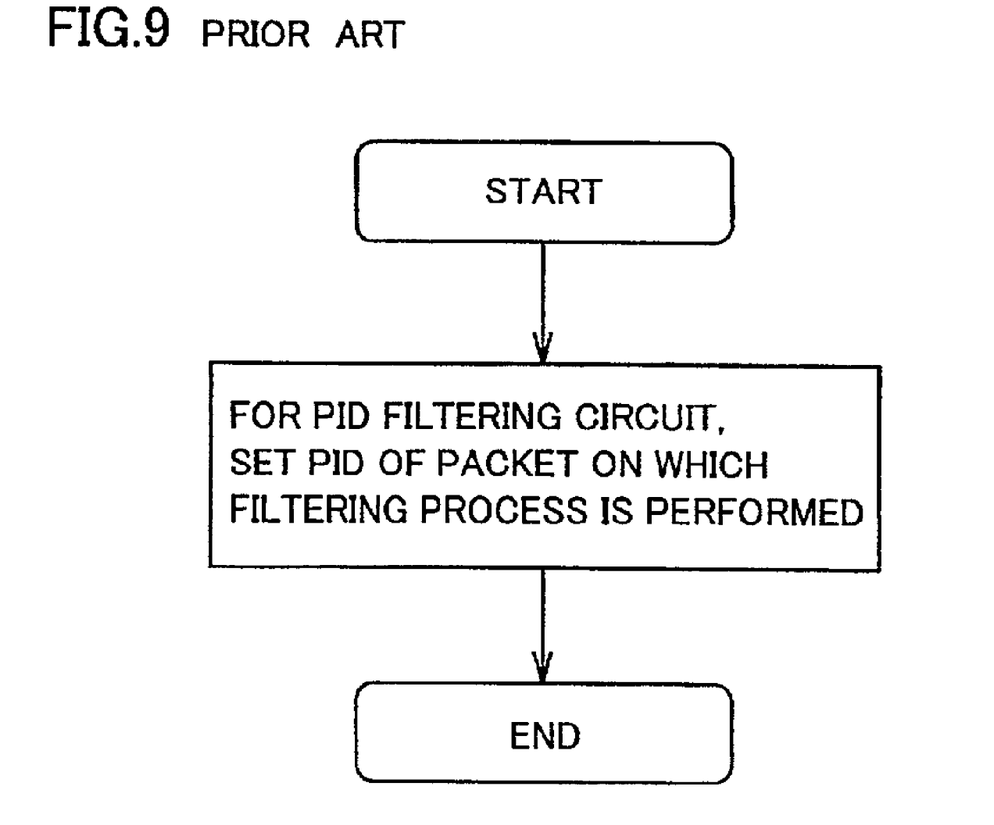
FIG. 9 is a flow chart showing the process performed by CPU144 to control TS decoder 104.1.

FIG. 9 is a flow chart showing a process performed by CPU 144 to control TS decoder 104.1 shown in FIG. 8.

For PID filtering circuit 1050, CPU 144 sets a PID for a packet on which a filtering process is to be performed. PID filtering circuit 1050 selects a packet based on the set PID.

Figure 10:
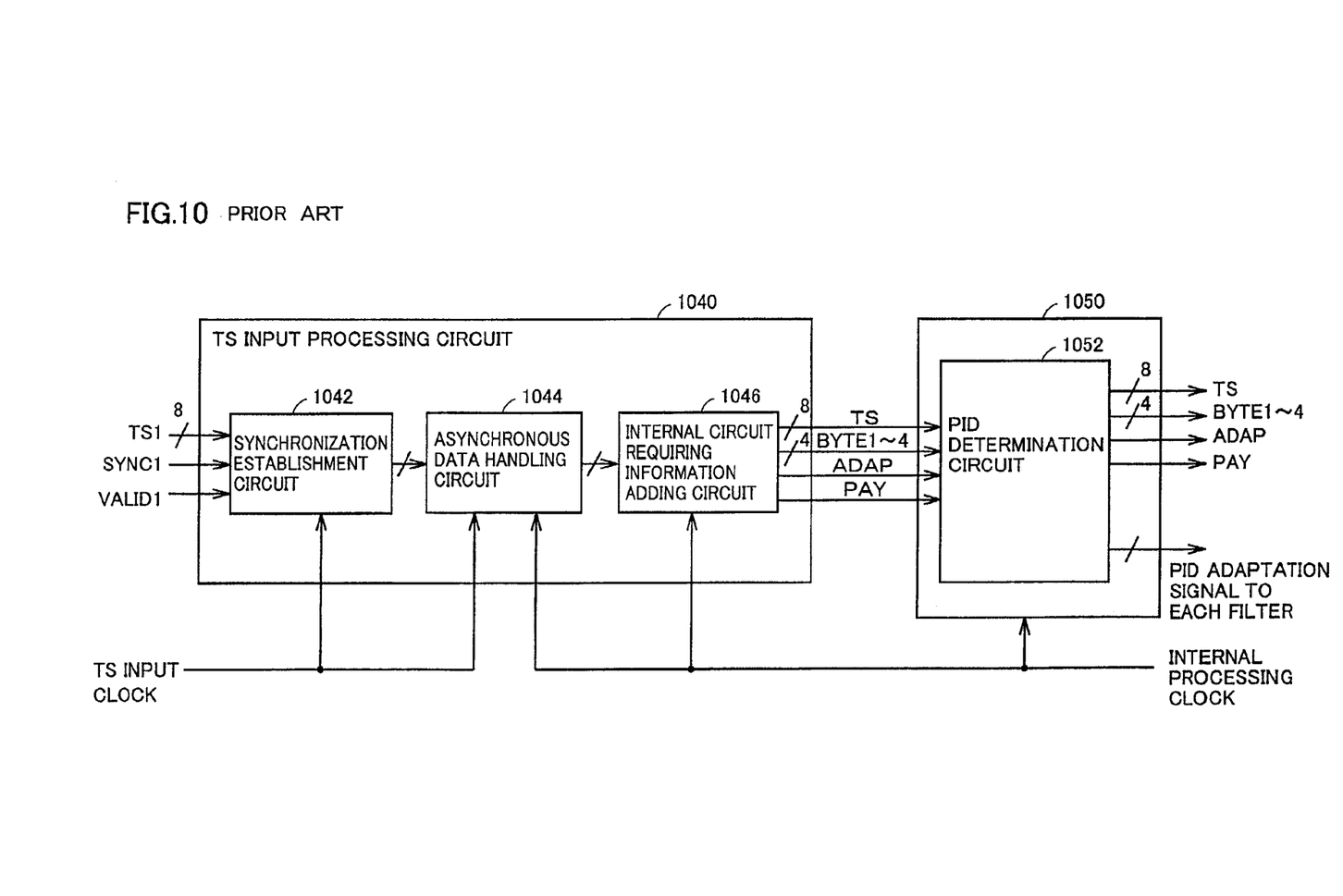
FIG. 10 is a schematic block diagram for illustrating the configurations of TS input processing circuit 1040 and PID filtering circuit 1050.

FIG. 10 is a schematic block diagram for illustrating the configurations of TS input processing circuit 1040 and PID filtering circuit 1050 shown in FIG. 8.

Referring to FIG. 10, TS input processing circuit 1040 includes a synchronization establishment circuit 1042 receiving transport stream signal TS provided by PSK demodulation circuit 102.1 at the front end, a synchronization signal SYNC indicating a starting position of transport stream signal TS, and a valid signal VALID indicating that input transport stream signal TS is a normal signal in accordance with a reception state and the like, and operating based on the TS input clock provided from the front end, to synchronize transport stream signal TS; an asynchronous data handling circuit 1044 receiving the TS input clock (normally at a few MHz) and an internal processing clock for synchronizing the operation of the internal circuit (normally at several tens of MHz), to synchronize a signal output from synchronization establishment circuit 1042 with the internal processing clock; and an internal circuit requiring information adding circuit (hereinafter referred to as information adding circuit) 1046 receiving an output of asynchronous data handling circuit 1044 and producing an output with addition of TS information required in the subsequent processes.

Here, when signal SYNC is supplied from the front end of digital broadcasting receiving device 2000 as described above, synchronization establishment circuit 1042 establishes synchronization for transport stream signal TS based on the supplied signal SYNC. By contrast, when no signal SYNC is supplied, i.e., for example, when transport stream signal TS is supplied from external storage device 180 or the like, the synchronization establishment process is performed based on a synchronizing signal in transport stream signal TS.

Information adding circuit 1046 operates in response to the internal processing clock, and adds to signal TS, for example, signals BYTE1 to BYTE4 each indicating which one of four bites of the header in transport stream signal TS provided by 188 bytes is output, and signals ADAP and PAY indicating that the output signal is either one of a signal of an adaptation field and a signal of a payload, respectively.

PID filtering circuit 1050 includes a PID determination circuit 1052 operating in response to the internal processing clock, to receive signal TS, signals BYTE1 to BYTE4, and signals ADAP and PAY, and to output a PID adaptation signal indicating which one of section filtering circuit 1060 and A/V data filtering circuit is adapted to the output signal.

As described above with reference to FIGS. 6 to 10, in the conventional digital broadcasting receiving device 2000, an independent TS decoder must be provided for each transport stream in order to accommodate different types of transport streams. Therefore, when the number of transport streams to be handled increases, the number of independent TS decoders must also be increased accordingly, causing a problem of larger circuit scale or the like. Moreover, when a receiver is formed with a circuit scale in a prescribed range, a limitation is set for the number of transport streams that can be handled.

Figure 11:
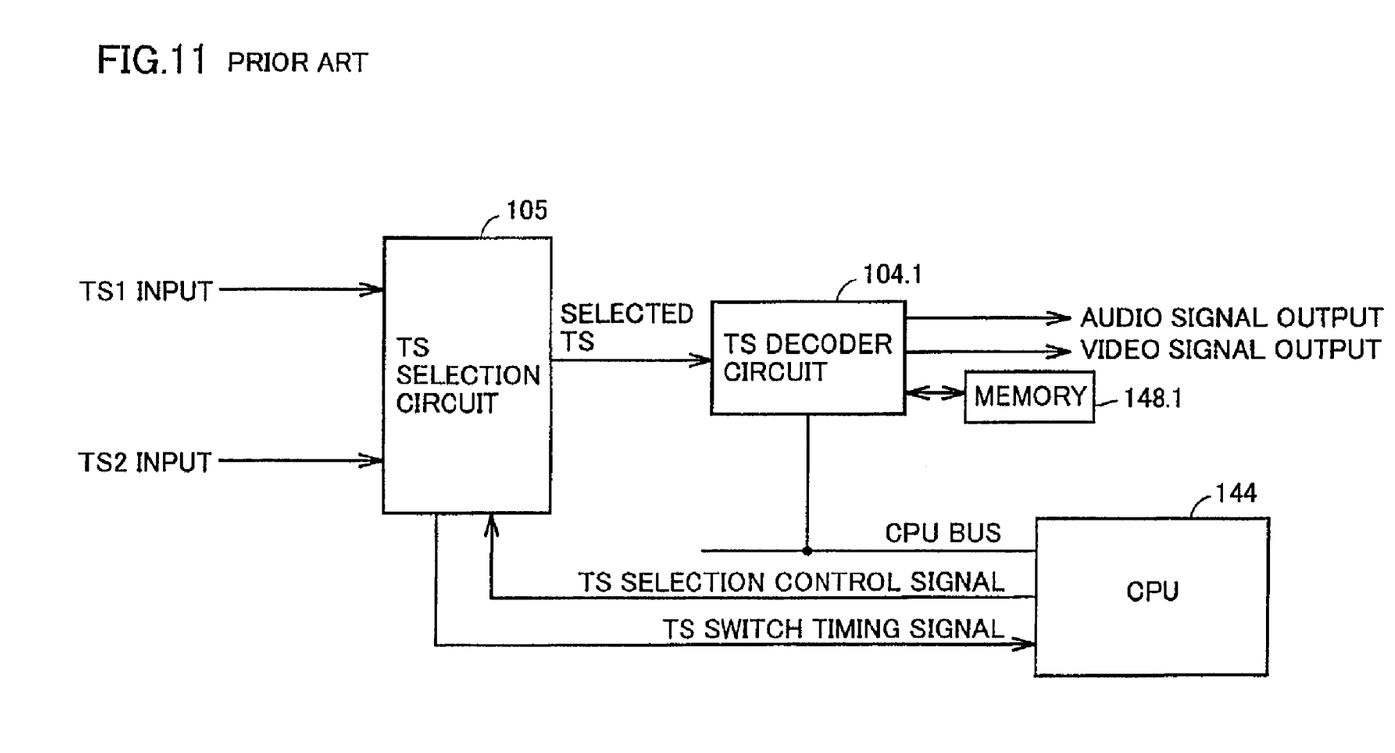
FIG. 11 is a schematic block diagram showing another configuration of a TS decoder of a digital broadcasting receiving device for accommodating different types of transport streams.

FIG. 11 is a schematic block diagram showing another configuration of a TS decoder in a digital broadcasting receiving device for accommodating different types of transport streams.

In the configuration shown in FIG. 11, a TS selector circuit 105 is provided, at the preceding stage of TS decoder 104.1, for selecting a required TS from a plurality of input TSs, under the control of CPU144.

Such a configuration allows provision of only one independent TS decoder even if different types of transport streams must be handled. However, a problem remains in that TS selector circuit 105 must be separately provided.

SUMMARY OF THE INVENTION

An object of the present invention is to provide a TS decoder having a reduced circuit scale even when different types of transport streams are to be handled, and to provide a digital broadcasting receiving device having such a TS decoder mounted therein.

Another object of the present invention is to provide a TS decoder that can flexibly change the number of different types of transport streams that can be handled, and a digital broadcasting receiving device having such a TS decoder mounted therein.

According to one aspect of the present invention, a transport stream decoder receiving a plurality of different transport streams to extract a selected transport stream includes a synchronizing portion, a matching portion, a storing portion, a time-division multiplexing portion, and a filtering portion.

The synchronizing portion receives the plurality of different transport streams and a plurality of input clocks corresponding to the plurality of different transport streams respectively, to establish synchronization between the transport streams and the input clocks. The matching portion matches an output of the synchronizing portion with an internal clock having a frequency higher than a frequency of the plurality of input clocks, based on the plurality of input clocks and the internal clock. The storing portion stores a plurality of transport stream signals corresponding to the plurality of different transport streams output from the matching portion, respectively. The time-division multiplexing portion receives an output of the storing portion, to convert the plurality of transport stream signals into a time-division multiplexing signal synchronizing with the internal clock, and to generate an identification signal indicating which one of the plurality of different transport streams is associated with the time-division multiplexing signal. The filtering portion extracts a signal corresponding to the selected transport stream of the plurality of different transport streams, based on an output of the time-division multiplexing portion.

According to another aspect of the present invention, a digital broadcasting receiving device includes a receiving portion, a demodulating portion, a transport stream decoder, and a decoding portion.

The receiving portion selectively receives a plurality of different transport streams transmitted via broadcasting. The demodulating portion receives an output of the receiving portion to demodulate the output into a baseband signal. The transport stream decoder receives the plurality of different transport streams to extract a selected transport stream.

The transport stream decoder includes a synchronizing portion, a matching portion, a storing portion, a time-division multiplexing portion, and a filtering portion.

The synchronizing portion receives the plurality of different transport streams and a plurality of input clocks corresponding to the plurality of different transport streams respectively, to establish synchronization between the transport streams and the input clocks. The matching portion matches an output of the synchronizing portion with an internal clock having a frequency higher than a frequency of the plurality of input clocks, based on the plurality of input clocks and the internal clock. The storing portion stores a plurality of transport stream signals corresponding to the plurality of different transport streams output from the matching portion, respectively. The time-division multiplexing portion receives an output of the storing portion, to convert the plurality of transport stream signals into a time-division multiplexing signal synchronizing with the internal clock, and to generate an identification signal indicating which one of the plurality of different transport streams is associated with the time-division multiplexing signal. The filtering portion extracts a signal corresponding to the selected transport stream of the plurality of different transport streams, based on an output of the time-division multiplexing portion.

The decoding portion reproduces a video signal and an audio signal, based on an output of the transport stream decoder.

Therefore, a main advantage of the present invention is to suppress increase of the circuit scale even if the number of different transport streams to be processed is increased, and to allow the device to flexibly accommodate a greater number of different transport streams.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
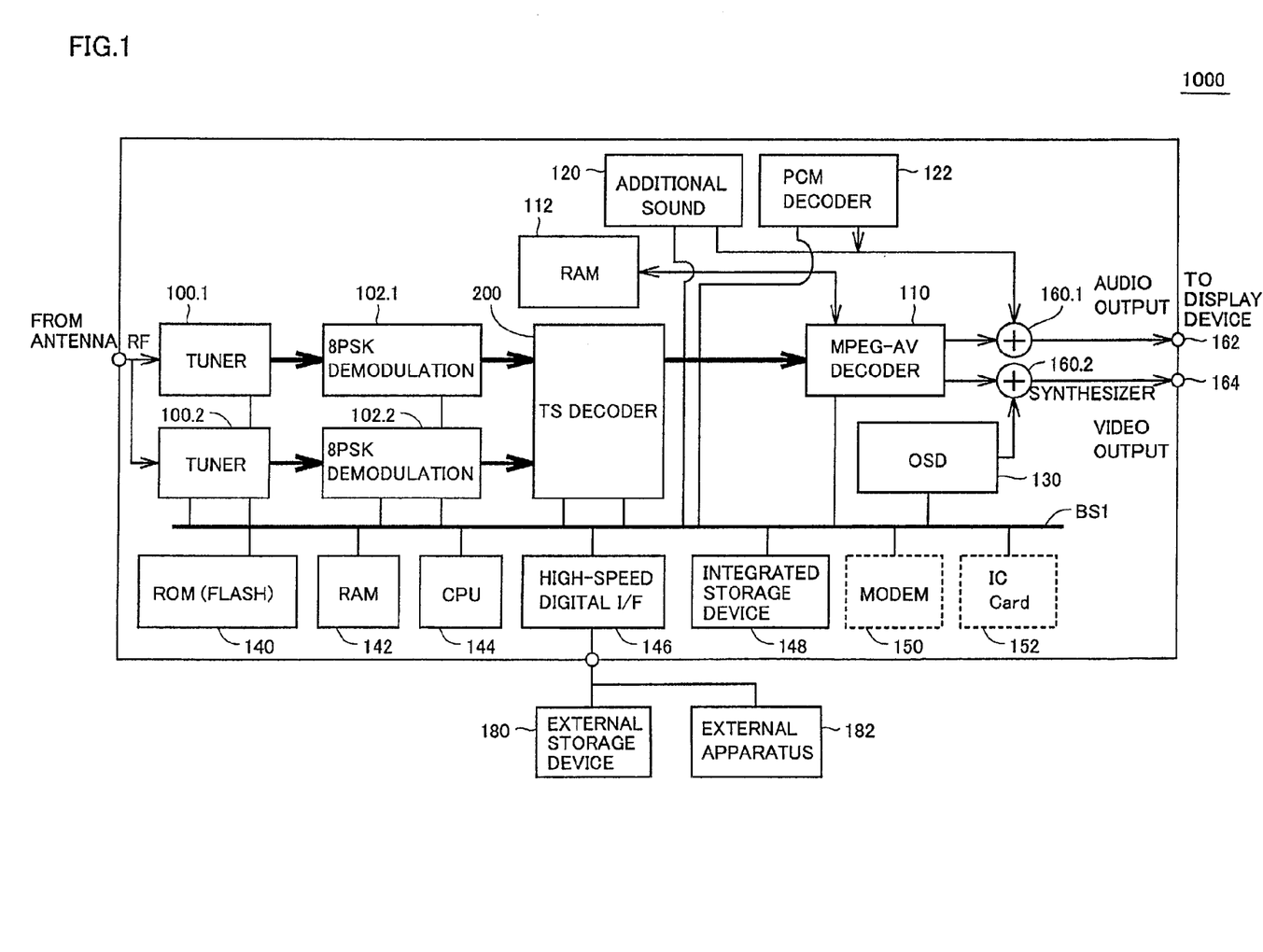
FIG. 1 is a schematic block diagram for illustrating the configuration of a digital broadcasting receiving device 1000 having a TS decoder 200 according to the present invention mounted therein.

FIG. 1 is a schematic block diagram for illustrating the configuration of a principle portion of digital broadcasting receiving device 1000 having TS decoder 200 according to the present invention mounted therein.

Digital broadcasting receiving device 1000 is different from the conventional digital broadcasting receiving device 2000 shown in FIG. 6 in that TS decoder 200 is provided, which receives two different transport streams TS1 and TS2 applied from 8PSK demodulators 102.1 and 102.2, decodes the transport streams by time division, and provides the selected transport stream to MPEG-AV decoder 110, and in that device 1000 includes such a program that allows CPU144 to control TS decoder 200.

As for the rest, digital broadcasting receiving device 1000 is similar to digital broadcasting receiving device 2000. Thus, identical portions are denoted by the same reference character, and the description thereof will not be repeated.

Note that, though the number of different transport streams is shown as at most two in FIG. 1, TS decoder 200 of the present invention may easily accommodate a greater number of different transport streams by increasing the clock frequency of the internal processing clock, as will become apparent in the description below.

Moreover, the transport streams input into TS decoder 200 may be transport streams transmitted by, in addition to satellite BS or CS digital broadcasting, different types of broadcasting such as CS digital broadcasting at 110 degrees east longitude, terrestrial digital broadcasting and the like, or may be transport streams supplied by media other than broadcasting, for example, a recording medium such as a hard disk (HDD).

Figure 2:
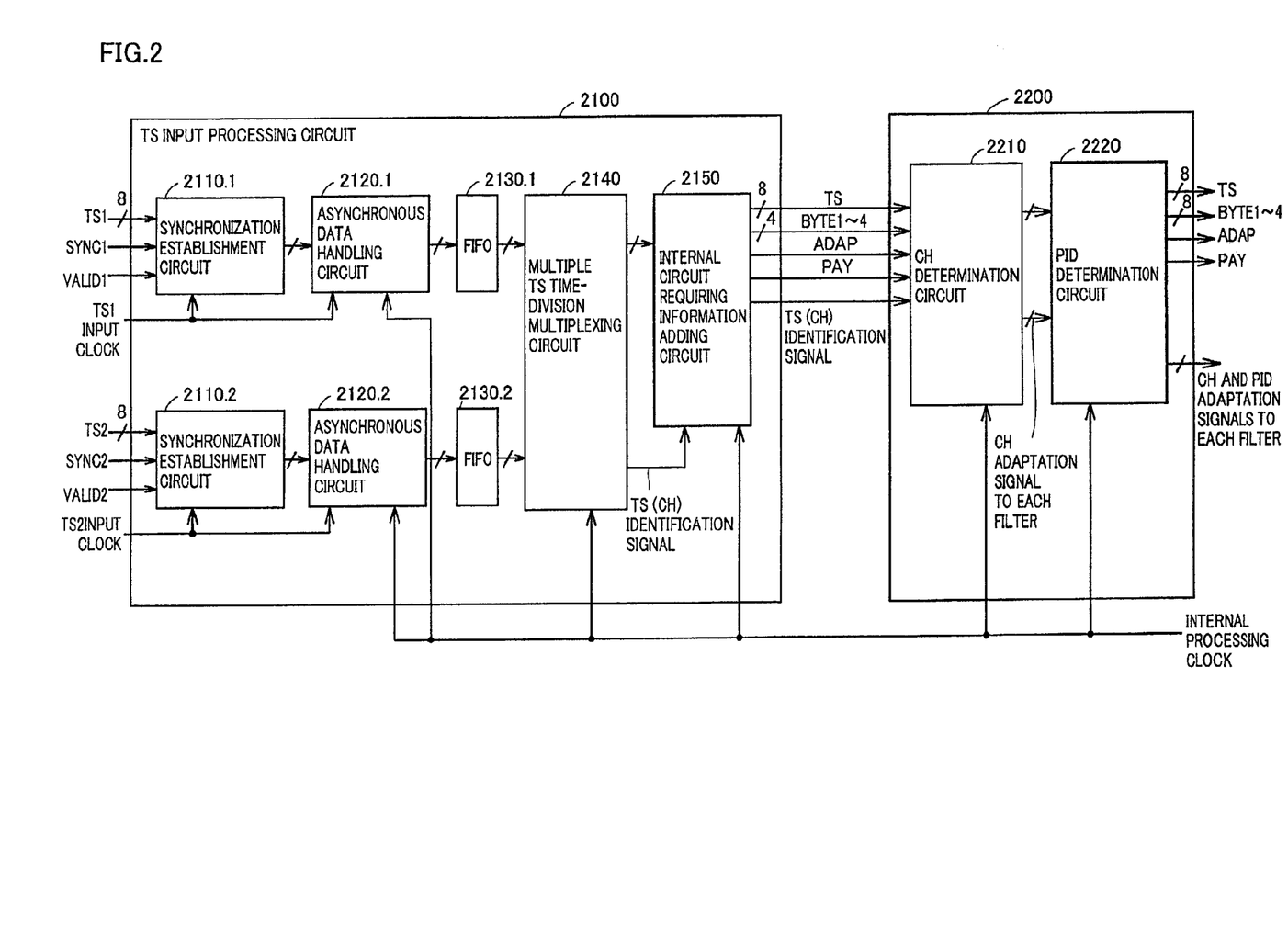
FIG. 2 is a schematic block diagram for illustrating the configurations of TS input processing circuit 2100 and PID filtering circuit 2200.

FIG. 2 is a schematic block diagram for illustrating the configurations of TS input processing circuit 2100 and PID filtering circuit 2200 in TS decoder 200 shown in FIG. 1. It is noted that a section data filtering circuit and an A/V data filtering circuit that operate based on the internal processing clock are provided at the succeeding stage of PID filtering circuit 2200, which are not shown in FIG. 2.

Referring to FIG. 2, TS input processing circuit 2100 includes a synchronization establishment circuit 2110.1 operating based on a TS1 input clock provided from the front end, and receiving transport stream signal TS1 applied from PSK demodulation circuit 102.1 at the front end, a synchronization signal SYNC1 indicating the starting position of transport stream signal TS1 and a valid signal VALID1 indicating that transport stream signal TS1 to be input is a normal signal in accordance with a reception state or the like, to synchronize transport stream signal TS1 with the TS1 input clock; and a synchronization establishment circuit 2110.2 operating based on a TS2 input clock provided from the front end, and receiving transport stream signal TS2 applied from PSK demodulation circuit 102.2 at the front end, a synchronization signal SYNC2 indicating the starting position of transport stream signal TS2 and a valid signal VALID2 indicating that transport stream signal TS2 to be input is a normal signal in accordance with a reception state or the like, to synchronize transport stream signal TS2 with the TS2 input clock.

TS input processing circuit 2100 further includes asynchronous data handling circuit 2120.1 receiving TS1 input clock (normally at a few MHz) and the internal processing clock (normally at several tens of MHz) for synchronizing the operation in the internal circuit, to synchronize a signal output from synchronization establishment circuit 2110.1 with the internal processing clock; an asynchronous data handling circuit 2120.2 receiving TS2 input clock and the internal processing clock for synchronizing the operation in the internal circuit, to synchronize a signal output from synchronization establishment circuit 2110.2 with the internal processing clock; first-in first-out memories (hereinafter FIFO) 2130.1 and 2130.2 receiving and temporarily storing outputs of asynchronous data handling circuits 2120.1 and 2120.2 respectively; a multiple TS time-division multiplexing circuit 2140 operating based on the internal processing clock, to receive outputs of FIFOs 2130.1 and 2130.2, to time-division multiplex transport stream signals TS1 and TS2, and to generate a TS identification signal for identifying which transport corresponds to each of the time-division multiplexed signals; and an information adding circuit 2150 receiving an output of multiple TS time-division multiplexing circuit 2140 and producing an output with addition of TS information to be required in the subsequent processes.

As in the case with the conventional synchronization establishment circuit 1042, when signals SYNC1 and SYNC2 are supplied from the front end of digital broadcasting receiving device 1000, synchronization establishment circuits 2110.1 and 2110.2 establish synchronization for transport stream signals TS1 and TS2 based on such signals SYNC1 and SYNC2, while when no signal SYNC1 (or SYNC2) is supplied, i.e., when transport stream signal TS1 (or TS2) is supplied from external storage device 180 or the like, the synchronization establishment is performed based on a synchronizing signal in transport stream signal TS (or TS2).

Information adding circuit 2150 operates in accordance with the internal processing clock, and produces an output with addition of, for example, signals BYTE1 to BYTE4 each indicating which one of four bytes of the header in transport stream signal TS1 (or TS2) provided by a prescribed number of bytes is output, signals ADAP and PAY indicating that the signal output is either one of a signal of an adaptation filed and a signal of a payload respectively, and the TS identification signal provided from multiple TS time-division multiplexing circuit 2140.

PID filtering circuit 2200 includes a CH determination circuit 2210 operating in accordance with the internal processing clock, receiving signal TS, signals BYTE1 to BYTE4, and signals ADAP and PAY, determining if each signal corresponds to a channel (CH) of the transport stream signal selected based on the TS identification signal, and generating a CH adaptation signal indicating the determination result; and a PID determination circuit 2220 receiving an output of CH determination circuit 2210, and outputting the CH adaptation signal and a PID adaptation signal indicating that the signal to be output is adapted to either one of section filtering circuit 1060 and the A/V data filtering circuit.

The section data filtering circuit provided at the succeeding stage of PID filtering circuit 2200 receives and filters section data based on the PID adaptation signal and CH adaptation signal from PID filtering circuit 2200, and produces an output to a memory 148.1 for temporarily saving the section data. On the other hand, the A/V data filtering circuit provided at the succeeding stage of PID filtering circuit 2200 receives and filters video and audio signals based on the PID adaptation signal and CH adaptation signal from PID filtering circuit 2200, and produces an output toward MPEG-AV decoder 110.

Though transport stream signal TS and the TS identification signal are shown as signals of different systems in FIG. 2, the TS identification signal itself may be multiplexed as transport stream signal TS, as will be described below.

Figure 3:
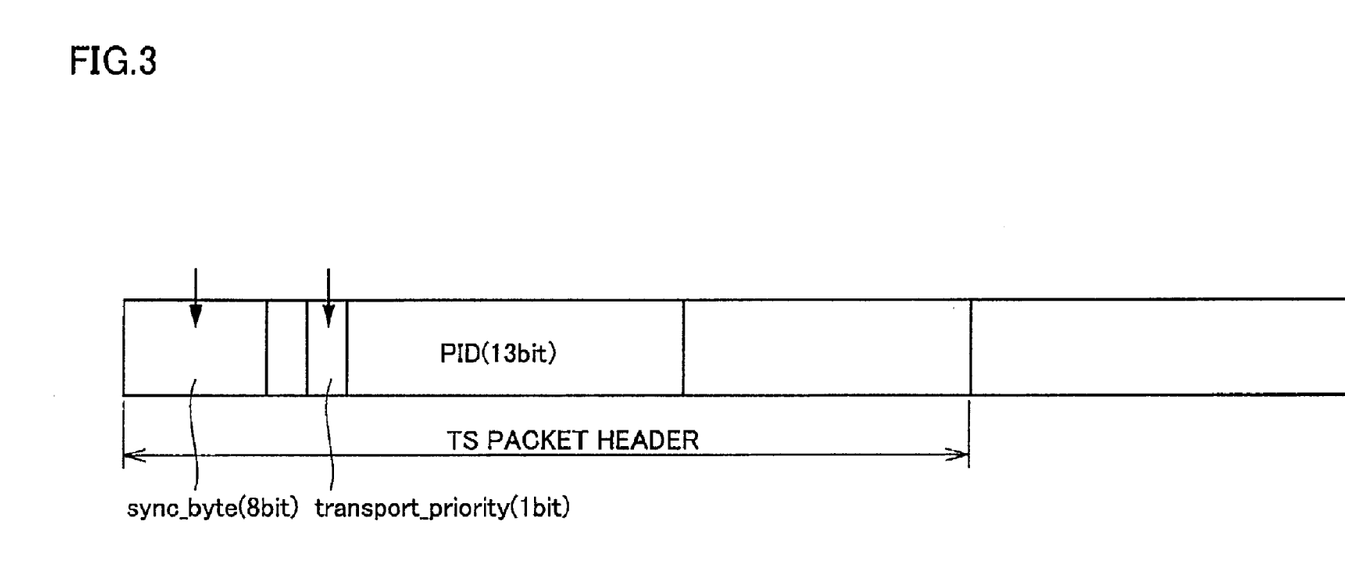
FIG. 3 is a schematic view showing the configuration of a header of a transport stream signal TS.

FIG. 3 is a schematic view showing the configuration of a header of transport stream signal TS.

Referring to FIG. 3, a 32-bit TS packet header of transport stream signal TS includes, besides 13-bit PID data, for example, 8-bit synchronization data sync_byte used for synchronization, and 1-bit data transport_priority indicating a priority, which will become unnecessary in the succeeding circuits, once synchronization is established for transport stream signal TS.

Therefore, the TS identification signal may be written into such data portions that will become unnecessary, in order to multiplex the TS identification signal itself as transport stream signal TS without any adverse effect on the process in the succeeding circuits.

Figure 4:
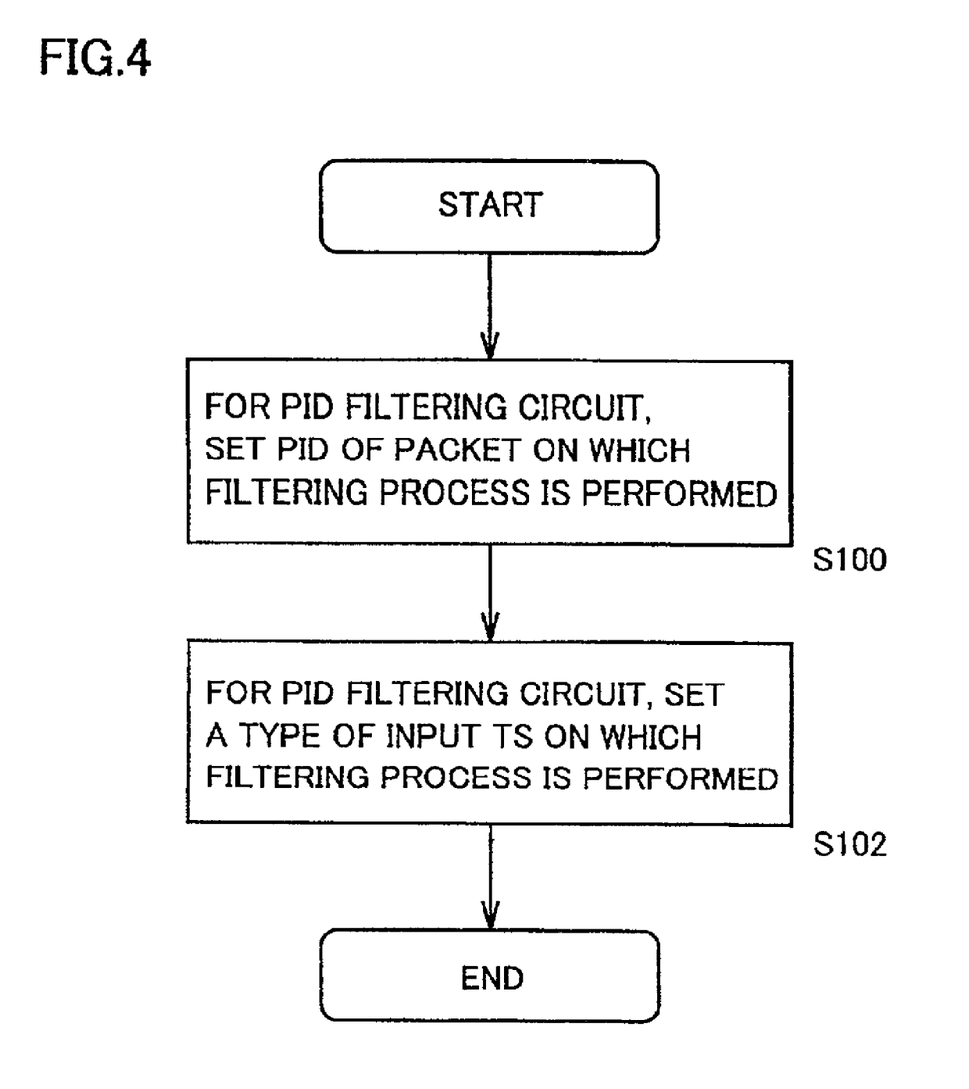
FIG. 4 is a flow chart showing the process performed by CPU144 to control TS decoder 200 shown in FIG. 1.

FIG. 4 is a flow chart showing the process performed by CPU144 to control TS decoder 200 shown in FIG. 1.

For PID filtering circuit 2200, CPU144 sets a PID of a packet on which a filtering process is to be performed (step S100).

Subsequently, CPU144 sets, for PID filtering circuit 2200, the type of input TS by which the filtering process is performed (step S102).

PID filtering circuit 2200 selects a packet, i.e., generates the CH adaptation signal and PID adaptation signal, based on the types of PID and TS to be processed that are set accordingly.

Figure 5:
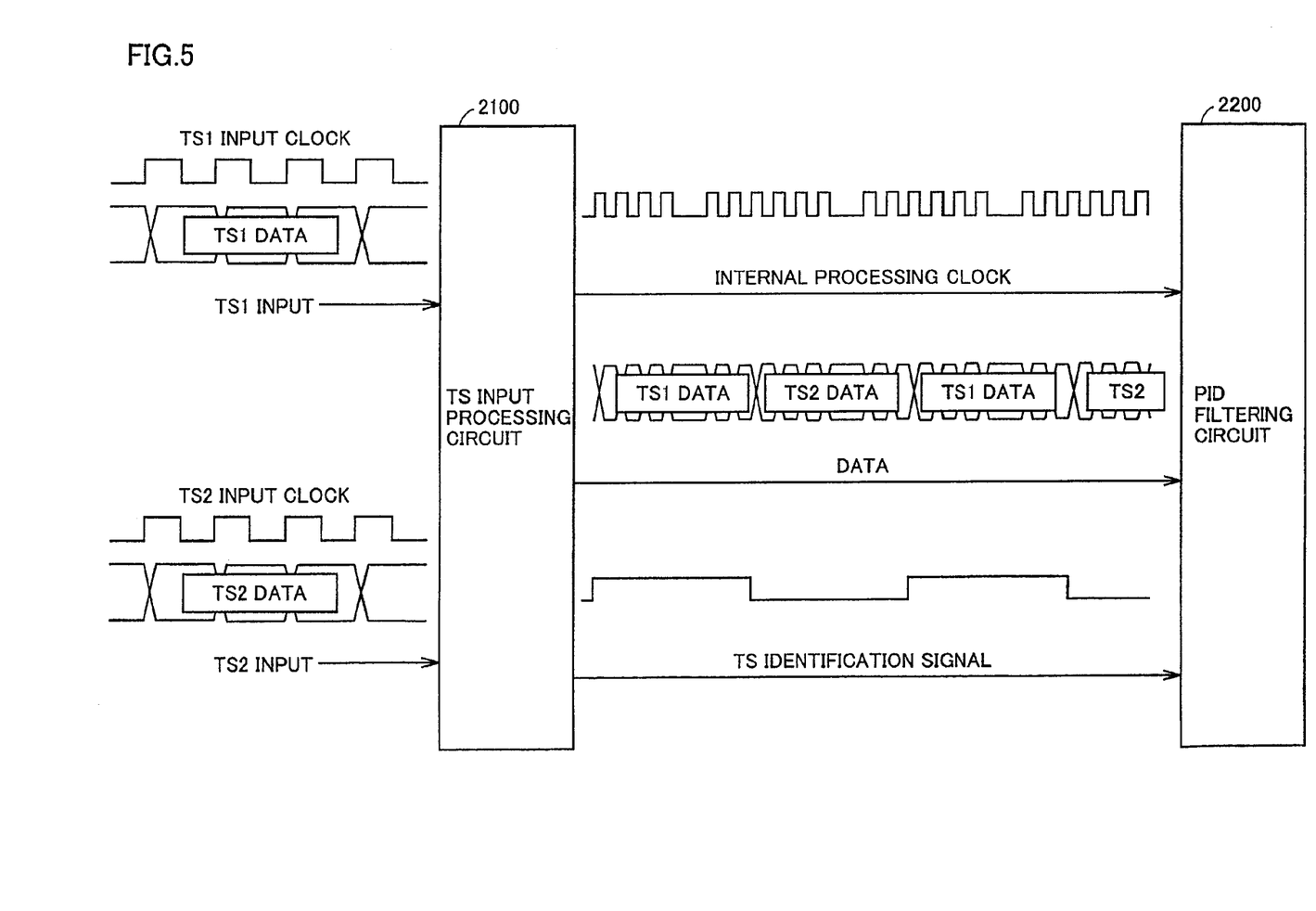
FIG. 5 is a schematic view for illustrating the operation timing of TS input processing circuit 2100 and PID filtering circuit 2200.

FIG. 5 is a schematic view for illustrating the operation timing of TS input processing circuit 2100 and PID filtering circuit 2200 described with reference to FIG. 2.

To TS input processing circuit 2100, transport stream signal TS1 is provided in synchronization with the TS1 input clock, whereas transport stream signal TS2 is provided in synchronization with the TS2 input clock.

From TS input processing circuit 2100, transport stream signals TS1 and TS2 that are time-division multiplexed are output to PID filtering circuit 2200 in synchronization with the internal processing clock.

Here, a 1-bit TS identification signal is output from TS input processing circuit 2100 to PID filtering circuit 2200 in order to identify the two transport stream signals TS1 and TS2. When 2n (n is a natural number) transport streams are time-division multiplexed, an n-bit TS identification signal may be used.

Therefore, multiple TS time-division multiplexing circuit 2140 in TS input processing circuit 2100 time-division multiplexes transport stream signals, preventing increase of the circuit scale even if the number of different transport streams to be handled is increased.

In addition, the number of transport stream signals that can be multiplexed by multiple TS time-division multiplexing circuit 2140 can be increased by making the frequency of the internal clock higher, allowing the device to easily accommodate a greater number of different transport streams.

It is noted that TS decoder 200 described above may be formed as an integrated circuit which is integrated on one chip. Furthermore, other functional blocks in digital broadcasting receiving device 1000 shown in FIG. 1 and TS decoder 200 can also be formed as an integrated circuit on one chip.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transport stream decoder receiving a plurality of different transport streams to extract a selected transport stream, comprising:
    a synchronizing portion receiving said plurality of different transport streams and a plurality of input clocks corresponding to said plurality of different transport streams respectively, to establish synchronization between said transport streams and said input clocks;
    a matching portion to match an output of said synchronizing portion with an internal clock having a frequency higher than a frequency of said plurality of input clocks, based on said plurality of input clocks and said internal clock;
    a storing portion to store a plurality of transport stream signals corresponding to said plurality of different transport streams output from said matching portion, respectively;
    a time-division multiplexing portion receiving an output of said storing portion, to convert said plurality of transport stream signals into a time-division multiplexing signal synchronizing with said internal clock, and to generate an identification signal indicating which one of said plurality of different transport streams is associated with said time-division multiplexing signal; and
    a filtering portion to extract a signal corresponding to the selected transport stream of said plurality of different transport streams, based on an output of said time-division multiplexing portion;
    said filtering portion comprising:
        a determination circuit operating in accordance with said internal clock, receiving the signal corresponding to the selected transport stream of said plurality of different transport streams, determining whether the received signal corresponds to a channel of the selected transport stream based on said identification signal, and generating an adaptation signal indicating the determination result; and
        a filtering circuit receiving the adaptation signal from said determination circuit, and performing filtering based on the adaptation signal.

2. The transport stream decoder according to claim 1, wherein
    said time-division multiplexing signal includes a plurality of data trains,
    said identification signal includes a plurality of parts corresponding to said plurality of data trains respectively, and
    each of said plurality of parts indicates one of said plurality of transport stream signals.

3. The transport stream decoder according to claim 1, wherein
    said plurality of different transport streams include a plurality of transport streams corresponding to different types of satellite broadcasting, respectively.

4. The transport stream decoder according to claim 1, wherein
    said plurality of different transport streams include a transport stream transmitted via broadcasting and a transport stream from a storage medium.

5. A digital broadcasting receiving device, comprising:
    a receiving portion selectively receiving a plurality of different transport streams transmitted via broadcasting;
    a demodulating portion receiving an output of said receiving portion to demodulate the output into a baseband signal;
    a transport stream decoder receiving said plurality of different transport streams to extract a selected transport stream,
    said transport stream decoder including
    a synchronizing portion receiving said plurality of different transport streams and a plurality of input clocks corresponding to said plurality of different transport streams respectively, to establish synchronization between said transport streams and said input clocks,
    a matching portion to match an output of said synchronizing portion with an internal clock having a frequency higher than a frequency of said plurality of input clocks, based on said plurality of input clocks and said internal clock,
    a storing portion to store a plurality of transport stream signals corresponding to said plurality of different transport streams output from said matching portion, respectively,
    a time-division multiplexing portion receiving an output of said storing portion, to convert said plurality of transport stream signals into a time-division multiplexing signal synchronizing with said internal clock, and to generate an identification signal indicating which one of said plurality of different transport streams is associated with said time-division multiplexing signal, and
    a filtering portion to extract a signal corresponding to the selected transport stream of said plurality of different transport streams, based on an output of said time-division multiplexing portion; and
    a decoding portion to reproduce a video signal and an audio signal, based on an output of said transport stream decoder;
    said filtering portion comprising:
        a determination circuit operating in accordance with said internal clock, receiving the signal corresponding to the selected transport stream of said plurality of different transport streams, determining whether the received signal corresponds to a channel of the selected transport stream based on said identification signal, and generating an adaptation signal indicating the determination result; and
        a filtering circuit receiving the adaptation signal from said determination circuit, and performing filtering based on the adaptation signal.

6. The transport stream decoder according to claim 5, wherein said time-division multiplexing signal includes a plurality of data trains, said identification signal includes a plurality of parts corresponding to said plurality of data trains respectively, and each of said plurality of parts indicates one of said plurality of transport stream signals.

7. The digital broadcasting receiving device according to claim 5, further comprising an interface portion connectable to a storage medium for receiving and storing an output of said receiving portion, said transport stream decoder receiving a transport stream from said storage medium in addition to said transport streams transmitted via broadcasting.

* * * * *